United States Patent [19]

Okada et al.

[11] 3,993,524

[45] Nov. 23, 1976

[54] ADHESIVE BONDING METHOD ALLOWING NONDESTRUCTIVE SEPARATION OF BONDED MATERIALS

[75] Inventors: Yasuhiro Okada; Kensho Shirota, both of Sayama, Japan

[73] Assignee: Nissan Motor Co., Ltd., Yokohama, Japan

[22] Filed: July 1, 1975

[21] Appl. No.: 592,283

[30] Foreign Application Priority Data

Aug. 19, 1974 Japan.............................. 49-94727

[52] U.S. Cl................................. 156/155; 29/423; 29/426; 149/2; 156/82; 156/94; 156/247; 156/327; 156/330; 156/335; 252/186; 252/187 H; 260/2 EC; 260/47 EC

[51] Int. Cl.².................... B32B 31/26; B32B 31/12; C09J 3/14

[58] Field of Search ............... 156/155, 344, 82, 94, 156/330, 335, 327, 333, 334, 247; 29/423, 426; 65/23; 149/2; 252/186, 187 H; 260/2 EC, 2 EP, 47 EC; 432/225

[56] References Cited

UNITED STATES PATENTS

| | | | |
|---|---|---|---|
| 2,711,775 | 6/1955 | Batchelor et al. ................. | 156/344 |
| 3,348,640 | 10/1967 | Thompson et al. ............. | 156/344 X |
| 3,383,192 | 5/1968 | Siegmund ........................ | 156/155 X |
| 3,420,794 | 1/1969 | May et al........................ | 156/330 X |
| 3,446,874 | 5/1969 | Varker............................. | 156/333 X |
| 3,899,382 | 8/1975 | Matsuda et al. ................ | 156/334 X |

*Primary Examiner*—William A. Powell
*Assistant Examiner*—Thomas Bokan
*Attorney, Agent, or Firm*—Frank J. Jordan

[57] ABSTRACT

Incombustible materials are bonded together with a self-burning adhesive composition which is a mixture of an organic polymer base structural adhesive as typified by an epoxy adhesive and an oxidizer as exemplified by an ammonium perchlorate powder, so that the bonded materials can be disassembled nondestructively, if desired, by heating the joint to the ignition point of the composition and leaving the composition in the joint to burn self-supportedly until it vanishes.

6 Claims, 1 Drawing Figure

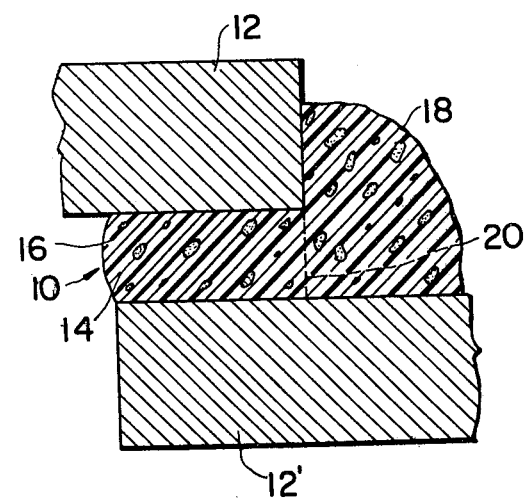

ADHESIVE BONDING METHOD ALLOWING NONDESTRUCTIVE SEPARATION OF BONDED MATERIALS

This invention relates to a method of bonding two or more members of incombustible materials with each other and disassembling the bonded members, in case of need, after completion of bonding without breaking the respective members and to an adhesive composition for use in such a method.

The development of various adhesives including those which are capable of bearing considerably heavy loads and called structural adhesives as exemplified by epoxies, phenolic resins and synthetic rubber base adhesives has made adhesive bonding processes be applicable to almost every structural material.

The adhesive bonding has many performance advantages over the other traditional joining methods and at the same time brings about a considerable saving of labor cost. Strange to say, outstanding strength of an adhesive joint sometimes turns out a practical disadvantge that the bonded materials can not be disassembled without breaking or damaging them. When, for example, an automobile body is fabricated exclusively by means of adhesive bondings for the economical reason on the occasion of a trial or experimental production, it is frequently hoped in vain that the once fabricated body may be disassembled nondestructively either for modification or for observation of experimental results.

It is an object of the present invention to provide a novel method for bonding a plurality of members of either the same or different incombustible materials with each other with a polymer base adhesive and disassembling the bonded materials, in case of need, after completion of bonding without breaking the respective members.

It is another object of the invention to provide a novel method using an adhesive composition which composition is self-burning or combustible in the presence of no external oxygen and substantially vanishes when a layer thereof existing in an adhesive joint is heated to the ignition temperature of the composition.

In a method according to the invention, a conventional organic polymer base adhesive is preliminarily mixed with an oxidizer in an amount enough to make the adhesive combustible in the presence of no external oxygen. Then a layer of the resulting adhesive mixture is formed between two members of either the same or different kinds of incombustible materials in usual ways thereby to bond the two members with each other. When there needs disassembly of the bonded members, the adhesive mixture layer is heated to a temperature at which the adhesive mixture ignites and thereafter left to burn self-supportedly until the layer burns up and vanishes.

An adhesive composition according to the invention for the accomplishment of the above described method essentially consists of a known organic polymer base adhesive and an oxidizer in an amount enough to make the adhesive composition combustible in the presence of no external oxygen. The adhesive is preferably an epoxy, phenolic resin or synthetic rubber base structural adhesive, and the oxidizer is preferably an inorganic oxygen-containing compound in the powder form.

The invention will be fully understood from the following detailed description of preferred embodiments thereof with reference to the accompanying drawing, in which:

the single FIGURE is a sectional and explanatory side view of an adhesive bond layer formed between two sheets of metal plates by a method according to the invention.

The essential feature of the invention resides in the addition of an oxidizer to a conventional adhesive to give a self-burnable adhesive composition and destruction by combustion of an adhesive bond layer formed by the use of such a composition whenever desired.

Many of conventional structural adhesives are useful for a method according to the invention. With regard to adhesives, it is a sole prerequisite to the realization of the invention that the adhesives are combustible, or serve as fuel without losing their adhesive properties when mixed with an oxidizer. In other words, the choice of an adhesive in a method of the invention can be done practically in the same manner as in conventional bonding processes since most of current structural adhesives contain an organic polymer or polymers as their essential component and meet the above prerequisite. Epoxies, phenolic resins and synthetic rubber base adhesives are most preferred examples of useful structural adhesives taking into consideration both the bonding performances and combustibility.

A method according to the invention is applicable to bonding of a variety of materials only if the materials are incombustible and heat-resistant. From a practical viewpoint, the invention is mainly concerned with bonding of metals.

It is practically impossible to burn up a thin layer of a conventional adhesive formed between bonded materials even though the adhesive is combustible since a major portion of the adhesive layer is completely isolated from the ambient atmosphere. The preliminary addition of an oxidizer to the adhesive eliminates the necessity of any external oxygen supply for burning the adhesive layer. The oxidizer is selected from numerous compounds which are known as oxidizers useful for the preparaton of self-burning compositions such as propellants, gas-generating compositions and other pyrotechnic compositions. Most preferred examples are inorganic solid oxidizers such as ammonium perchlorate $NH_4ClO_4$, potassium permanganate $KMnO_4$, potassium nitrate $KNO_3$, trilead tetroxide $Pb_3O_4$ and chromium trioxide $CrO_3$.

These oxidizers are preferably suspended or dispersed in the form of powder in the polymer base adhesive, The particle size of which powder ranges between about 5 and about 1000 microns. When one of these oxidizers is mixed with the adhesive, the oxidizer is sometimes dissolved in the adhesive either partly or entirely depending on the adhesive. The objects of the invention can be accomplished even if the oxidizer-containing composition is not in the form of dispersion but solution of the oxidizer powder in the polymer adhesive. The proportion of the oxidizer to the adhesive is determined such that the resulting composition ignites and burns self-supportedly when heated to a temperature distinctly higher than room temperature and at least a little higher than a curing or setting temperature of the adhesive, and the numerical value of the proportion varies over wide ranges depending on the combination of the adhesive and oxidizer.

Useful oxidizers in the invention include other than the aforementioned compounds: permanganates of a monovalent metal (represented by the symbol M) $MMnO_4$; chromates of a monovalent metal $M_2CrO_4$; dichromates of a monovalent metal $M_2Cr_2O_7$; perchlorates of a monovalent metal $MClO_4$; chlorates of a monovalent metal $MClO_3$; hypochlorites of a monovalent metal MClO; nitrates of a metal or ammonium such as $AgNO_3$, $Pb(NO_3)_2$, $Cu(NO_3)_2$, $Ba(NO_3)_2$ and $NH_4NO_3$; and metal oxides such as $Na_2O_2$, $BaO_2$, $MnO_2$, $CeO_2$, $PbO_2$ and $Ag_2O$. Besides, some organic nitro compounds such as nitrobenzene, nitrocellulose and nitroglycerine and some organic peroxides as exemplified by dibenzoyl peroxide also are useful oxidizers in the present invention.

The oxidizer is added to the adhesive and the two components are mixed thoroughly with each other as a preliminary step of an adhesive bonding process. Then the resulting adhesive composition is applied to the surfaces of the materials to be bonded similarly to the application of a conventional oxidizer-free adhesive followed by the usual bonding procedures including the step of curing or setting the adhesive, or eliminating the solvent contained in the adhesive. Curing accelerators may be employed in the same ways as in conventional adhesive bonding processes.

In the single FIGURE, a layer 10 of a combustible adhesive composition according to the invention is formed between two sheets of metal plates 12 and 12' which are of either the same or different materials. Particles 14 of an oxidizer is dispersed in a continuous layer 16 of a polymer base adhesive. When the adhesive composition layer 10 is extremely thin, an exposed deposit 18 is preferably formed adjacently to the joint so as to adjoin an exposed side surface 20 of the adhesive composition layer 10 for facilitating the ignition of this layer 10. Accordingly the deposit 18 is shaped to be considerably larger in width at least in one direction compared with the thickness of the adhesive composition layer 10.

If there needs nondestructive disassembly of the thus bonded plates 12 and 12', the exposed surface 20, or the deposit 18 if it is formed, is heated so as to cause the oxidizer particles 14 to decompose and liberate oxygen. The heating can be carried out in any way. For example, the end face 20 or the deposit 18 may be heated gradually by the use of an electric heater, but may alternatively be directly set fire with a match. The organic polymer base adhesive 16 functions as a fuel in the presence of the thus liberated oxygen and at the elevated temperature, so that combustion of the adhesive composition layer 10 occurs at the end face 20 or the deposit 18 and proceeds inwards until the layer 10 burns up entirely and substantially vanishes. As a result, the metal plates 12 and 12' can be separated easily from each other.

The invention will be further illustrated by the following example.

EXAMPLE

A two-part epoxy resin adhesive and an ammonium perchlorate powder were mixed with each other in equal amounts by weight. The particle size of the powder was in the range between 20 and 400 microns. Two sheets of steel plates were bonded with each other by the application of the resulting adhesive composition to form a lap joint. The adhesive composition layer 10 in the joint was about 500 microns thick, and deposit 18 of the adhesive composition was formed as illustrated in the FIGURE. After completion of bonding by curing the adhesive composition layer 10 in a well known manner, the deposit 18 was heated by an electric heater until the deposit 18 ignited at about 300° C. Thereafter, combustion of the adhesive composition layer 10 proceeded at a burning rate of about 3 mm/sec until the layer 10 vanished finally. The steel plates were easily separated from each other and able to be reused.

The joint in this example exhibited a shear strength value roughly equal to 70% of a standard value obtained for a similar joint with the same adhesive containing no oxidizer. The reduction in the strength by about 30% resulting from the addition of the oxidizer had practically no influence on the quality of the joint since the above standard value was extremely high and apparently more than sufficient.

What is claimed is:
1. A method of bonding a member of an incombustible material with another member of an incombustible material and disassembling the bonded members after completion of bonding, the method comprising the steps of:
preparing an adhesive mixture of an organic polymer base adhesive and an oxidizer, the amount of said oxidizer being such that said adhesive mixture is combustible in the presence of no external oxygen;
forming a layer of said adhesive mixture sandwiched between the two members thereby to bond the two members with each other;
heating said layer to a temperature at which said adhesive mixture ignites;
leaving said layer to burn self-supportedly until said layer burns up and vanishes for non-destructive disassembly and recovery of said members.

2. A method as claimed in claim 1, wherein said organic polymer base adhesive is a structural adhesive selected from the group consisting of epoxy adhesives, phenolic adhesives and synthetic rubber base adhesives.

3. A method as claimed in claim 2, wherein said oxidizer is a powder of an inorganic oxygen-containing compound.

4. A method as claimed in claim 3, wherein the particle size of said powder ranges between about 5 and about 1000 microns.

5. A method as claimed in claim 3, wherein said adhesive mixture is a mixture of an epoxy adhesive and a powder of ammonium perchlorate in equal amounts by weight.

6. A method as claimed in claim 1, further comprising the step of forming a deposit of said adhesive mixture adjacent a joint in the bonded members, said deposit being exposed and conjoined with an exposed surface of said layer, thereby to facilitate the ignition of said layer.

* * * * *